United States Patent [19]
Koinzan

[11] 3,948,114
[45] Apr. 6, 1976

[54] DRIVE CHAIN WITH SLACK TAKE-UP SPRINGS

[76] Inventor: Walter J. Koinzan, P.O. Box 255, Elgin, Nebr. 68636

[22] Filed: Apr. 29, 1975

[21] Appl. No.: 572,921

[52] U.S. Cl. .......................... 74/242.11 C; 74/258
[51] Int. Cl.² ..................... F16H 7/12; F16G 13/02
[58] Field of Search .......... 74/258, 242.11 C, 250 R

[56] References Cited
UNITED STATES PATENTS
3,379,005  4/1968  Jones .............................. 74/258 X

*Primary Examiner*—Leonard H. Gerin
*Attorney, Agent, or Firm*—Clarence A. O'Brien; Harvey B. Jacobson

[57] ABSTRACT

A roller link chain for driving connection between a pair of sprocket wheels is provided and adjacent connecting link pivot shafts, spaced apart by one or more pivot shafts spaced therebetween, utilized to pivotally interconnect adjacent links of the chain include corresponding end portions which project outwardly of the same side of the chain. A slightly stretched expansion spring extends between and has its opposite end portions anchored to the outwardly projecting ends of the adjacent pivot shafts, whereby the spring will buckle the portion of the chain extending between the pivot shafts to which the spring is attached when the spring is moving along a "slack" reach of the chain. In this manner, excessive slack of the chain normally associated with the slack reach thereof will be taken up so as to reduce the running noise of the chain and the tendency of an otherwise excessively loose chain to jump one of the sprockets with which it is associated.

7 Claims, 4 Drawing Figures

DRIVE CHAIN WITH SLACK TAKE-UP SPRINGS

BACKGROUND OF THE INVENTION

Various forms of chain supported slack take-up devices have been heretofore provided. However, some of these slack take-up devices have had operational drawbacks associated therewith including excessive flexing or wear in the event the associated chain is trained about a small sprocket and the inability of the associated chain to pass about successive sprockets turning in opposite directions.

Examples of previously patented link chain slack take-up devices are disclosed in U.S. Pat. Nos. 615,203, 1,208,234, 1,275,329, 2,589,887 and 2,780,108.

BRIEF DESCRIPTION OF THE INVENTION

The link chain slack take-up structure of the instant invention is constructed in a manner whereby it may be readily added to existing roller link chains. Further, the slack take-up structure is operational in a manner which does not cause excessive wear to the chain or to the slack take-up structure in the event the chain passes about successive sprockets turning in opposite directions or the chain is caused to move about extremely small diameter sprockets.

The main object of this invention is to provide a roller link chain slack take-up structure which may be readily incorporated in the manufacture of new roller link chains or added to existing roller link chains.

Another object of this invention, in accordance with the immediately preceding object, is to provide a slack take-up structure which will not in any way affect the normal operation of the associated link chain and will require only slight additional side clearance on at least one side of the associated chain.

Yet another object of this invention is to provide a slack take-up structure utilizing only substantially conventional expansion springs and elongated pivot shaft portions of the associated roller link chain.

A final object of this invention to be specifically enumerated herein is to provide a roller link chain slack take-up structure which will conform to conventional forms of manufacture, be of simple construction and automatic in operation so as to provide that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
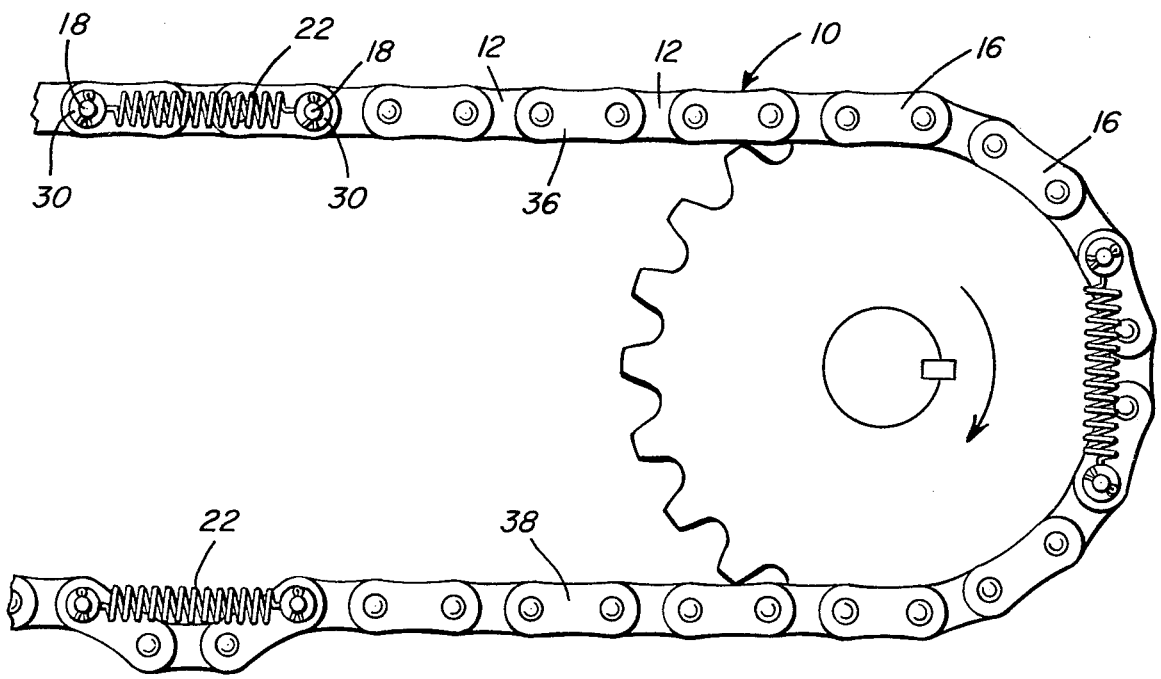
FIG. 1 is a fragmentary side elevational view of a roller link chain of conventional design having a portion thereof trained about a drive sprocket and with several link chain slack take-up structures of the instant invention operatively associated therewith.
Figure 2:
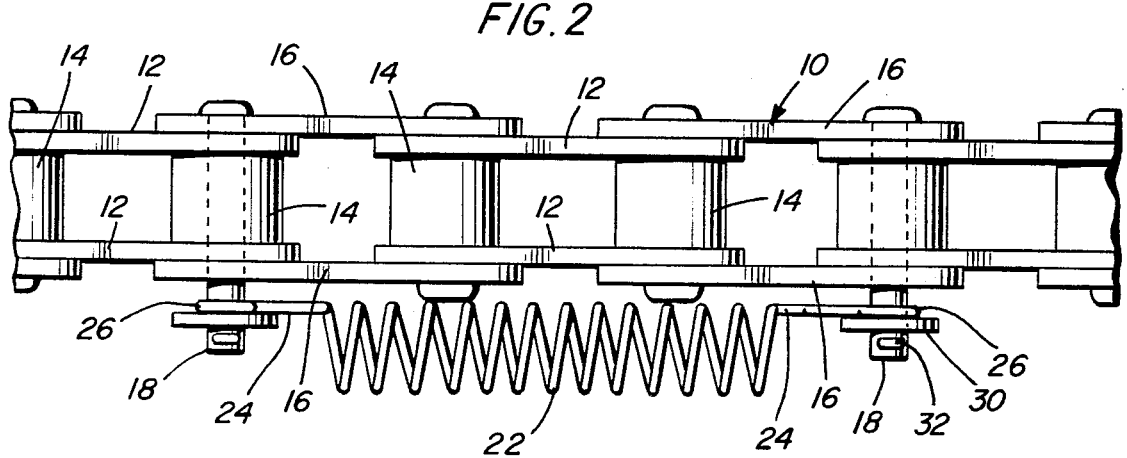
FIG. 2 is an enlarged fragmentary top plan view of the upper left hand portion of the roller link chain illustrated in FIG. 1.
Figure 3:
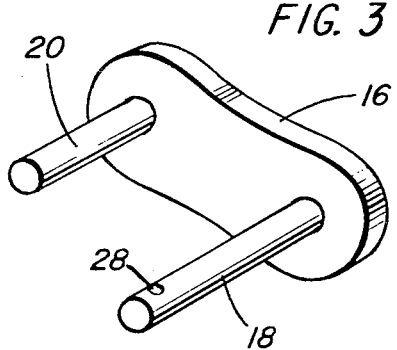
FIG. 3 is a perspective view of one of the connecting straps of the link chain illustrating a modified form of pivot shaft or pin supported therefrom as a part of the slack take-up structure of the instant invention.

With reference now more specifically to FIGS. 1, 2 and 3 of the drawings, the numeral 10 generally designates a conventional form of roller link chain including longitudinally spaced pairs of longitudinal links 12 provided with transverse roller members 14 disposed and extending between each pair of corresponding ends of the links 12. The rollers 14 have central bores formed therethrough and longitudinally spaced pairs of connecting links 16 extend between adjacent ends of the links 12 of each adjacent pairs of links 12. One connecting link 16 of each pair of links 16 includes a pair of opposite end laterally directed pivot shafts 18 and 20 rigidly supported therefrom and the pivot shafts 18 and 20 pass through the central portions of the corresponding ends of the links 12, have the corresponding rollers 14 journaled thereon and have their free ends secured through the corresponding opposite side connecting link 16.

Other than the shafts 18 being extended in length in relation to the length of the shafts 20 the foregoing comprises a description of a conventional form of roller link chain.

The shafts 18 are spaced along the chain 10 in pairs of shafts 18 having at least two shafts 20 spaced therebetween and an expansion spring 22 extends between and has its opposite ends anchored to the extended ends of each pair of shafts 18.

Each of the springs 22 includes opposite end endwise outwardly projecting stems 24 disposed on the side of the spring 20 adjacent the chain 10 and the free ends of the stems 24 include integral eye portions 26 through which the extended ends of the corresponding shafts 18 are rotatably received. Further, the extended ends of the shafts 18 are provided with diametric bores 28 and retaining washers 30 are disposed on the shafts 18 between the bores 28 and the eye portions 26 with cotter pins or similar fasteners 32 being passed through the bores 28 in order to retain the retaining washers 30 on the shafts 18.

It may be seen from FIG. 2 of the drawings that the springs 22 are spaced laterally outwardly of the corresponding side of the chain 10. Further, it will be noted from FIG. 1 that the springs 22 are in their maximum stretched conditions when they are disposed in the tensioned reach 36 of the chain 10 and that the springs 22 are somewhat contracted when they are disposed in the slack reach 38 of the chain 10. Still further, it may be appreciated that inasmuch as the springs 22 are substantially centered relative to the thickness of the chain 10 the latter may alternately pass about successive sprocket wheels turning in opposite directions without any interference from the springs 22. The only requirement which must be taken into consideration when using the springs 22 is that the chain 10 must have some additional side clearance.

Figure 4:
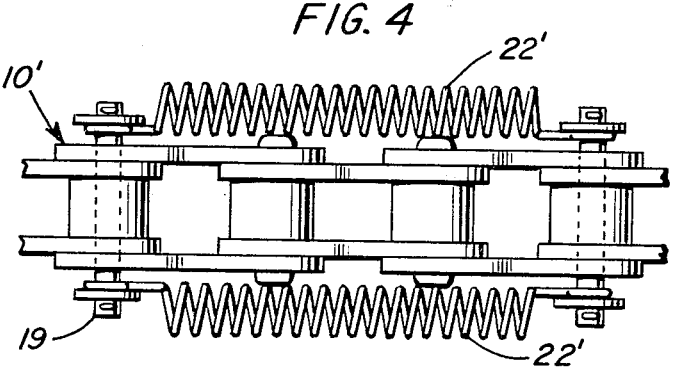
FIG. 4 is a fragmentary plan view of a section of roller link chain equipped with a double spring form a slack take-up structure.

With attention now invited more specifically to FIG. 4 of the drawings there will be seen a modified form of chain referred to in general by the reference numeral 10'. The chain 10' is substantially identical to the chain 10 and therefore has the various similar components thereof designated by corresponding prime reference numerals.

The only difference between the chain 10' and the chain 10 is that in lieu of the pivot shafts 18 further lengthened pivot shafts 19 are provided which project outwardly from both sides of the chain 10'. Of course, the opposite ends of each pivot shaft 19 include diametric bores (not shown) corresponding to the bores 28 and in this manner a pair of opposite side tension springs 22' may be used at each slack take-up position along the chain 10'. Of course, when utilizing the chain 10', additional side clearance must be provided on both sides of the chain for the opposite side tension springs 22 used thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In combination with a sprocket chain of the type including longitudinally spaced pairs of longitudinal links with corresponding ends of each pair of link straps interconnected by means of transverse members extending therebetween and with each pair of adjacent links connected at their adjacent ends by opposite side connecting straps extending therebetween and overlapped therewith and pivot shafts secured through overlapped ends of said link and connecting straps, one pair of corresponding ends of adjacent pivot shafts having at least one pivot shaft disposed therebetween projecting outwardly of the corresponding side of said chain, and an elongated at least slightly stretched expansion spring having its opposite ends anchored relative to said corresponding pivot shaft ends.

2. The combination of claim 1 wherein the other pair of corresponding ends of said adjacent pivot shafts are rigidly attached to the corresponding connecting links.

3. The combination of claim 1 wherein said transverse members comprise rollers journaled on the midportions of the corresponding pivot shafts.

4. The combination of claim 1 wherein the opposite ends of said expansion spring include endwise outwardly projecting integral stems disposed on the side of said spring adjacent said chain, the free ends of said stems being anchored to said two corresponding ends of said adjacent pivot shafts with said spring at least slightly spaced laterally outwardly of the adjacent side of said chain.

5. The combination of claim 1 wherein the other pair of corresponding ends of adjacent pivot shafts also project outwardly of the corresponding side of said chain, and a second at least slightly stretched expansion spring extending between and having its opposite ends anchored relative to said other pair of corresponding pivot shaft ends.

6. The combination of claim 5 wherein the opposite ends of said expansion spring include endwise outwardly projecting integral stems disposed on the side of said spring adjacent said chain, the free ends of said stems being anchored to the corresponding ends of said adjacent pivot shafts.

7. The combination of claim 1 wherein said adjacent pivot shafts have at least two pivot shafts spaced therebetween.

* * * * *